United States Patent
Nagano et al.

(10) Patent No.: US 11,650,773 B2
(45) Date of Patent: May 16, 2023

(54) SYSTEMS, APPARATUS, AND COMPUTER PROGRAM PRODUCTS FOR MANAGEMENT OF CERTIFICATES FOR THIRD PARTY APPLICATIONS ACCESSING PRINTING KIOSKS

(71) Applicant: KYOCERA Document Solutions Inc., Osaka (JP)

(72) Inventors: Daisaku Nagano, Pleasant Hill, CA (US); Hooman Majidzadeh Rezvani, Pleasant Hill, CA (US)

(73) Assignee: KYOCERA Document Solutions Inc.

( * ) Notice: Subject to any disclaimer, the term of this patent is extended or adjusted under 35 U.S.C. 154(b) by 363 days.

(21) Appl. No.: 16/887,551

(22) Filed: May 29, 2020

(65) Prior Publication Data

US 2021/0377256 A1   Dec. 2, 2021

(51) Int. Cl.
*G06F 3/12* (2006.01)
*H04L 9/40* (2022.01)

(52) U.S. Cl.
CPC .......... *G06F 3/1238* (2013.01); *G06F 3/1222* (2013.01); *G06F 3/1288* (2013.01); *H04L 63/0823* (2013.01); *H04L 63/0884* (2013.01)

(58) Field of Classification Search
None
See application file for complete search history.

(56) References Cited

U.S. PATENT DOCUMENTS

| | | | |
|---|---|---|---|
| 7,937,754 B2 | 5/2011 | Katano et al. | |
| 11,157,638 B1 * | 10/2021 | Kotha | G06F 3/1204 |
| 11,159,513 B1 * | 10/2021 | Nagano | G06F 3/1238 |
| 2004/0125403 A1 * | 7/2004 | Furst | H04L 9/40 |
| | | | 358/1.15 |
| 2005/0138065 A1 * | 6/2005 | Ciriza | H04L 67/51 |
| 2011/0030029 A1 * | 2/2011 | Woo | G03G 15/5075 |
| | | | 726/1 |
| 2018/0241574 A1 | 8/2018 | Kakutani et al. | |
| 2018/0359102 A1 * | 12/2018 | Kakutani | H04L 63/0823 |
| 2019/0034127 A1 * | 1/2019 | Chhabra | G06F 3/121 |
| 2019/0164165 A1 * | 5/2019 | Ithabathula | G06F 21/34 |
| 2019/0361632 A1 | 11/2019 | Hosoda | |
| 2019/0361634 A1 | 11/2019 | Inoue | |
| 2022/0230176 A1 * | 7/2022 | Gleeson | H04L 63/0823 |

FOREIGN PATENT DOCUMENTS

JP    2004118237 A   *   4/2004

* cited by examiner

*Primary Examiner* — Miya J Williams
(74) *Attorney, Agent, or Firm* — Law Office of Alexis J Saenz

(57) ABSTRACT

Embodiments facilitate the management of security certificates for third-party services being used to print documents from kiosks in public locales. The system establishes a gateway connection between a cloud-based host server, the third-party service, and the kiosk. When a user wishes to use the third-party service to print a document requested through the kiosk, the host server obtains the security certificate and installs the certificate in the kiosk. The kiosk may then request the document from the third-party service which forwards the document upon authentication of the security certificate details registered in the kiosk.

20 Claims, 4 Drawing Sheets

SYSTEMS, APPARATUS, AND COMPUTER PROGRAM PRODUCTS FOR MANAGEMENT OF CERTIFICATES FOR THIRD PARTY APPLICATIONS ACCESSING PRINTING KIOSKS

CROSS-REFERENCE TO RELATED APPLICATION

None.

FIELD

The subject disclosure relates to network-based device management and more particularly to systems, processes, and computer program products for management of certificates for third party applications accessing printing kiosks.

BACKGROUND

Many networked based services are now available to the general public. For example, printing services conventionally required one to use a store front that offered the services.

Today's printing behavior, however, also requires individuals to print on-the-go outside the office or home space. Sometimes a person needs to print a document from a third-party application. There are some print services available through kiosks that allow users to download the document from the third-party service to the kiosk.

However, when a third-party app is going to upload content to a kiosk, there is not currently any way for the kiosk to be able to trust the app or any content from the app.

As can be seen, there is a need to improve on the management of security of publicly available kiosks connected to a network.

SUMMARY

In one aspect of the disclosure, a method of managing third party authentication in a kiosk is disclosed. The method comprises: receiving at the kiosk, a request for a print job through a third-party service, wherein the third-party service is non-native to the kiosk; accessing, by a processing unit in the kiosk, a cloud-based print host server; obtaining by the host server, a security certificate; installing by the host server, a network gateway connected between the host server and the processing unit of the kiosk; installing, by the host server and through the gateway, the security certificate into memory of the kiosk.

In another aspect, a computer program product for managing third party authentication in a kiosk is disclosed. The computer program product comprises a non-transitory computer readable storage medium having computer readable program code embodied therewith. The computer readable program code is configured, when executed by a computer processor, to: receive at the kiosk, a request for a print job through a third-party service, wherein the third-party service is non-native to the kiosk; access, by a processing unit in the kiosk, a cloud-based print host server; obtain by the host server, a security certificate; install by the host server, a network gateway connected between the host server and the processing unit of the kiosk; install, by the host server and through the gateway, the security certificate into memory of the kiosks.

In yet another aspect, a host server is disclosed. The host server comprises: a network connection; a memory storage device; and a processor coupled to the network connection and connected to the memory storage device, wherein computer executable instructions in the memory storage device configure the processor to: receive at the kiosk, a request for a print job through a third-party service, wherein the third-party service is non-native to the kiosk; access, by a processing unit in the kiosk, a cloud-based print host server; obtain by the host server, a security certificate; install by the host server, a network gateway connected between the host server and the processing unit of the kiosk; install, by the host server and through the gateway, the security certificate into memory of the kiosk.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

Figure 1:
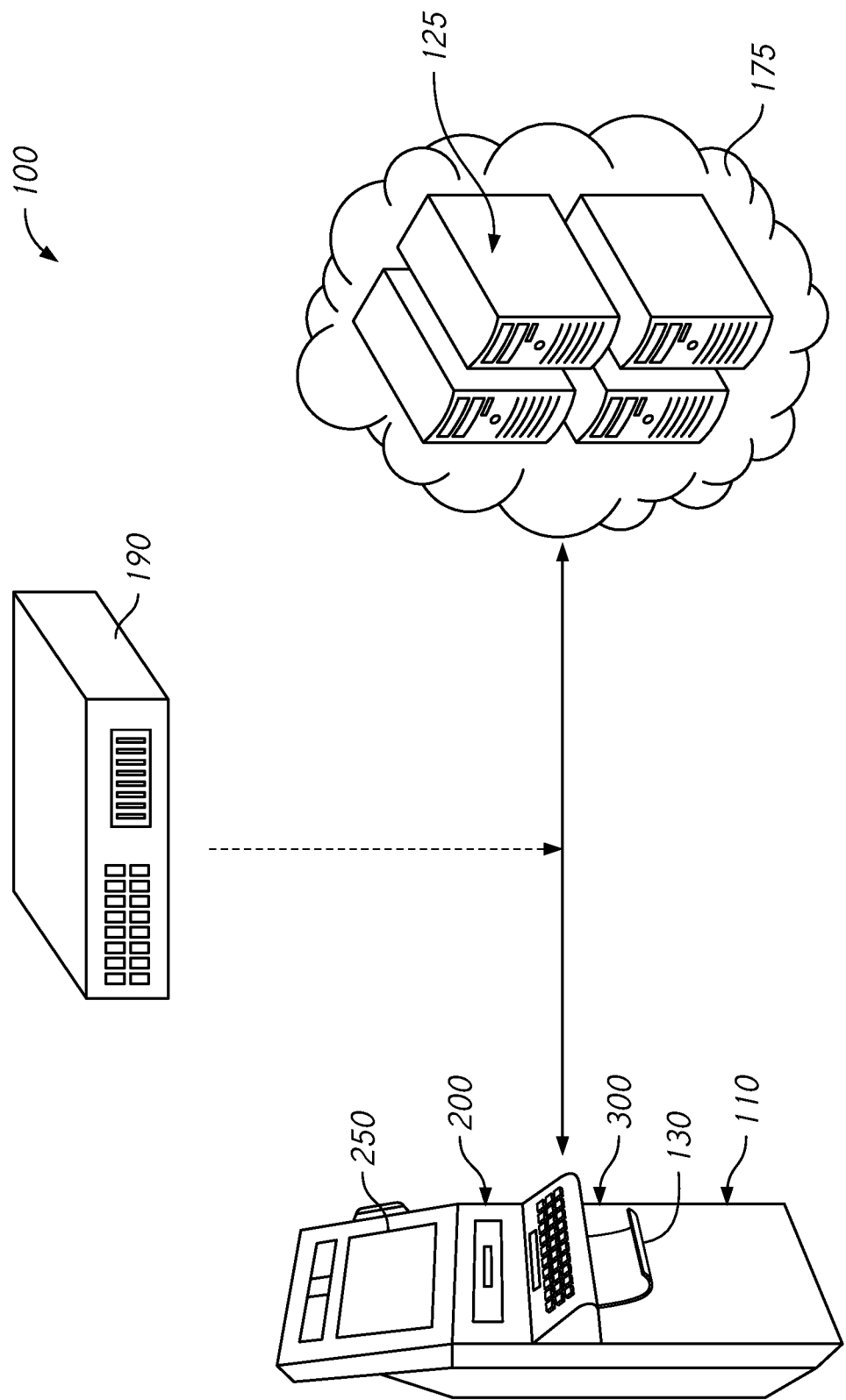
FIG. 1 is a block diagram of a system for managing certificates for third-party applications accessing kiosks in accordance with an embodiment of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. Like or similar components are labeled with identical element numbers for ease of understanding.

As will be appreciated, embodiments disclosed below may be practiced in and have industrial applicability to the general fields of network security and administration.

Generally, embodiments of the disclosure below facilitate the management of security certificates for kiosks that are used by people wishing to print documents through a third-party service in public locales. In one aspect, a remote service may make sure that a third-party app requesting to upload content is trusted by checking the third-party app certificate first. When the certificate meets security requirements, a process installs the third-party app certificate in the kiosk. Once the security certificate is installed, the third-party app can upload content to the kiosk. In the disclosure, a "third-party service" refers to a software based service that a user accesses in some way through a kiosk. In some embodiments, the third-party service may be non-native to the kiosk. For example, the user may access the third-party service through their own computing device, from where they can upload the document to a cloud-based printing service. The third-party service may forward the document to a kiosk which may be connected to a printer. In another embodiment, the third-party service may be accessed through a user interface of the kiosk via a web portal. The third-party service application may be non-native until accessed and installed locally onto the kiosk if the kiosk allows users to permanently install the application. However, in order for the local device (kiosk/printer) to receive the document, network protocols generally require security certificates to be authenticated between the third-party service computers and the kiosk to transmit the document securely.

Conventionally, for a kiosk to have a valid security certificate that is recognized by the third-party service, the administrators of the third-party service need to install security certificate files in the kiosk before the third-party service will communicate with the kiosk. However, the kiosk is generally not accessible to administrators of the third-party service through a network connection. Kiosks generally do not have a network connection that grants permissions to third parties.

Yet the need exists to provide a secure connection between the kiosk and a third-party service. This is because the third-party service, is an unknown/untrusted source from the perspective of the kiosk receiving documents for printing. The lack of a secure connection makes the document open to interception and some computers connected to the kiosk may not allow the print job to be executed if the message accompanying the print job is not secure. Conventionally, an individual technician would need to visit the kiosk site to manually install a security certificate directly into the kiosk's certificate repository. The repository may be for example, an electronic memory storage device in the kiosk. However, this is impractical for every service that wants to access the kiosk since it is unknown which kiosks users will access for services provided by the third party.

Referring generally to FIG. 1-4, in an exemplary embodiment of the subject technology, an intermediary host platform may install a gateway between the kiosk and the host platform's server. The host server obtains a security certificate from a source which may be directly from the third-party service. The host server may be configured to automatically install the security certificate in the kiosk once a user demand for a print job is made through the third-party service. This combination of features will solve a service's need to install and manage certificates for any kiosk accessible to the network.

Referring now to FIG. 1, a system 100 for managing third-party service authentication in kiosks is shown according to exemplary embodiments. The system 100 may include a kiosk 110 in communication with a network-based service 175 (which may be an online platform). The network-based service 175 may comprise a plurality of computer servers 125 in for example, a cloud-based network (sometimes referred to generally, as the "network 125"). In some embodiments, the kiosk 110 may comprise a computing device 200 contained within the kiosk housing. The computing device 200 may include a display 250 which shows a user interface (UI) through which users may see and interact with functions including for example, access a third-party service through a web portal application. In some embodiments, the kiosk 110 may include a printer 300 integrated into the kiosk housing. The printer 300 may be connected to the computing device 200. In some embodiments, a user may access a third-party computing device (for example, a smart phone or portable computing tablet) to download a document through the computing device 200 for printing. In embodiments where the kiosk 110 includes an integrated printer 300, print jobs may be output from the kiosk onto an output tray 130. In some embodiments, the user may access the third-party service through a personal mobile computing device (not shown) which may be for example, a smart phone, tablet computer, or wearable computing device. The user may direct the third-party service to print the document at the kiosk 110, which may be identified from a list of kiosks that the network 125 may access.

Figure 2:
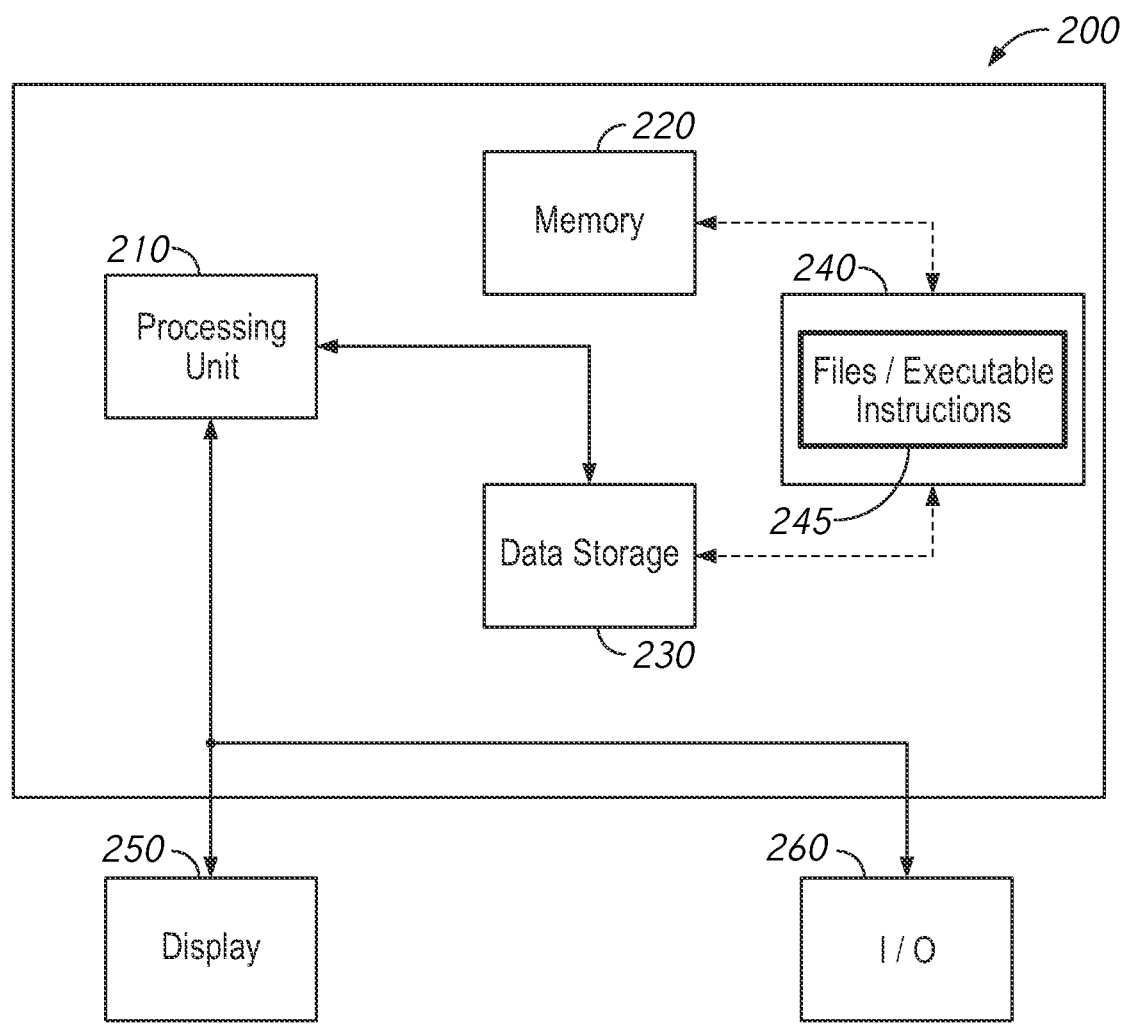
FIG. 2 is a block diagram of a computing device in accordance with an aspect of the subject technology.
Figure 3:
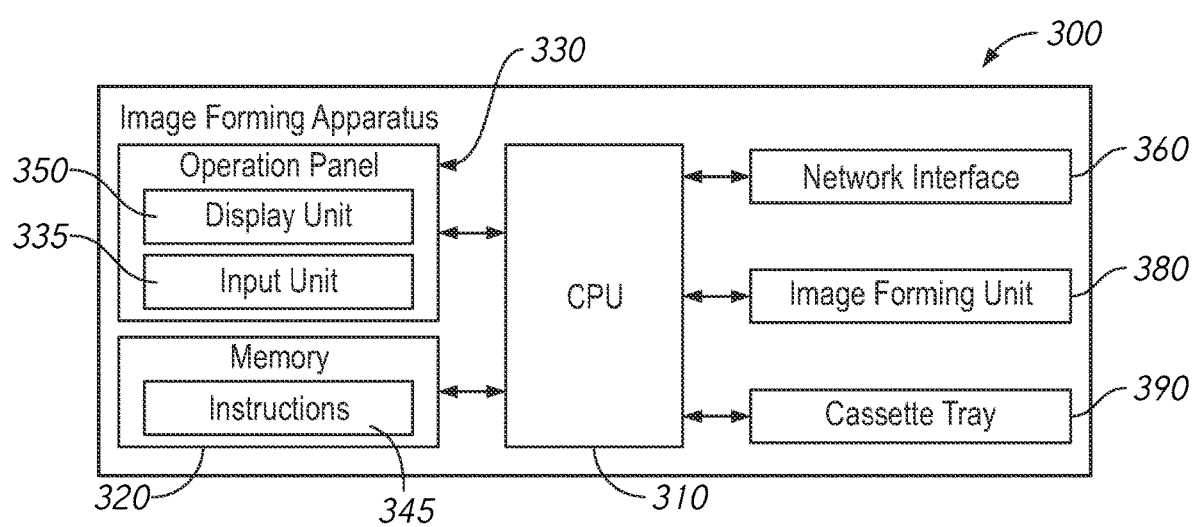
FIG. 3 is a block diagram of a printer device in accordance with an aspect of the subject technology.

The computer servers 125 may in some embodiments, fit the description of computing devices 200 as is discussed in more detail with respect to FIG. 2. While the figure shows only a single kiosk, for sake of illustration, it is understood that the network 125 may connect to a plurality of kiosks 110 in order to install security certificates as needed at any particular kiosk 110.

In an exemplary embodiment, a software application on the computing device 200 may allow the user to request the document from the third-party service for printing at the kiosk 110. A gateway 190 is installed that forwards the security certificate from the network 125 to the kiosk 110 to perform the transaction. The network 125 may route the document to the printer 300 once the security certificate requirements of the third-party service are met.

In an exemplary embodiment, the system 100 installs the gateway 190 so that security certificate transactions may be performed between the third-party service and the kiosk 110. The gateway 190 becomes part of the network for purposes of security management. As will be appreciated, in a conventional arrangement, a kiosk may be connected to a generic network. As will be appreciated, by installing the gateway 190 as needed as an intermediary between the third-party service and the kiosk 110 makes any kiosk with an available network connection readily enabled for installation of a valid security certificate.

Referring now to FIG. 2, a schematic of an example of a computing device 200 is shown in detail. As will be appreciated, some aspects of the embodiments disclosed above may turn the computing device 200 into a special purpose computer system that specifically manages, monitors, and renews security certificates for kiosks connected to the service 175. For example, in the role of a host server, the computing device 200 may implement for example the functions of registering a kiosk, checking for a valid certificate on the kiosk, storing security certificates, scheduling querying of kiosk certificate status, and determining validity of certificate statuses.

In the role of a user device, the computing device 200 is generally not a server but may instead be desktop computers, tablet or laptop computers, all-in-one computer stations, a mobile computing device (for example, a smart phone, smart wearable devices (glasses, jewelry, watches, ear wear, etc.)), or programmable electronics. In some embodiments, the computing device 200 is contained within the kiosk 110.

The components of the computing device 200, may include, but are not limited to, one or more processors or processing units 210, a system memory 220, data storage 230, a computer program product 240 having a set of program modules 245 including files and executable instructions, and a bus system that couples various system components including the system memory 220 to the processor(s) 210. The security certificates and associated keys or other certificate information may be stored in the data storage 230.

The computing device 200 may be described in the general context of computer system executable instructions, such as program modules 245 which represent a software embodiment of the system and processes described generally below. The program modules 245 generally carry out the functions and/or methodologies of embodiments as described above and below. As such, while not described in detail, the software modules (for example, the service 175) generally referred to above may be understood to be one example of program modules 245.

The computing device 200 may typically include a variety of computer system readable media. Such media could be chosen from any available media that is accessible by the computing device 200, including non-transitory, volatile and non-volatile media, removable and non-removable media for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing. The system memory 220 could include one or more computer system readable media in the form of volatile memory, such as a random-access memory (RAM) and/or a cache memory. By way of example only, the data storage system 230 may read from and write to a non-removable, non-volatile magnetic media device. The system memory 220 may include at least one program product 240 having a set of program modules 245 that are configured to carry out the functions of embodiments of the invention in the form of computer executable instructions. The program product/utility 240, having a set of program modules 245, may be stored in the system memory 220 by way of example, and not limitation, as an operating system, one or more application programs, other program modules, and program data. In some embodiments, the system memory 220 may temporarily store the security certificates and associated keys or other certificate information during the transactions for retrieving a document and authentication of print job message requests.

The computing device 200 may communicate with one or more external devices including for example, an electronic display 250 which may in some embodiments be configured for tactile response as in a touch screen display. User input into the display 250 may be registered at the processor 210 and processed accordingly. Other devices may enable the computing device 200 to communicate with one or more other computing devices, either by hardwire or wirelessly. Such communication can occur via Input/Output (I/O) interfaces/ports 260. In some embodiments, the I/O interfaces/ports 260 may be specially configured to handle aspects of the embodiments described herein converting the computing device 200 into a special purpose machine. As such the device 200 may become dedicated to the role of managing network security in a printing device.

The computing device 200, through the I/O interface/ports 260, may communicate with one or more networks such as a local area network (LAN), a general wide area network (WAN), and/or a public network (e.g., the Internet), and the network 125 via a network adapter. Each of the operating system, one or more application programs, other program modules, and program data or some combination thereof, may include an implementation of a networking environment. In some embodiments, the computing device 200 may be a cloud computing node connected to a cloud computing network (not shown). The computer computing device 200 may be practiced in distributed cloud computing environments where tasks are performed by remote processing devices that are linked through a communications network. In a distributed cloud computing environment, program modules may be located in both local and remote computer system storage media including memory storage devices.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "module", "circuit", or "system." Furthermore, aspects of the disclosed invention may take the form of a computer program product embodied in one or more computer readable media having computer readable program code embodied thereon. In some embodiments, the output of the computer program product provides an electronic user interface on the display 250 which may be controlled via direct contact with the display 250 or via the I/O interfaces 260 (which may be for example, interface devices such as keyboards, touchpads, a mouse, a stylus, or the like).

Aspects of the disclosed invention are described above with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor 210 of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks in the figures.

The printer 300 may be for example, a computing-based image processing and printing device (for example, a printer, a fax machine, a copier machine, a multi-function printer that may include a combination of these plus a scanner). The components of the printer 300, may include, but are not limited to, one or more processors or processing units 310, a system memory 320, an operation panel 330, an input unit 335, a set of program modules 345 including files and executable instructions, a display unit 350, a network interface 360, an image forming unit 380, a cassette tray 390, and a bus system that couples various system components including the system memory 320 to the processor(s) 310. The memory storage 320 may store for example, executable instructions and/or electronic versions of the image objects to be printed. In some embodiments, the system memory 320 includes a security management controller which may be for example, a processing unit 310 with executable instructions programmed into the processing unit. In some embodiments, the security management controller is software stored in the system memory 320. In other embodiments, the security management controller is stored on a computing device 200 connected to the printer 300. In some embodiments, the processors 310 may include a processing unit dedicated to graphics and image processing (for example a graphics processing unit (GPU) or visual processing unit (VPU). As a GPU or VPU, the processor 310 may implement executable instructions focused on image processing applications either alone or in coordination with other general processor 310 types such a CPUs, microchips, and the like. The input unit 335 may be for example, a scanner or I/O port receiving data from a computing device

200. In some embodiments, operation of the image forming unit may be controlled by a user interface accessed by either the operation panel 330 on the apparatus or through a user interface displayed via a program module 345 through a user's computing device.

For the following flowchart, steps of the processes may be referred to as blocks and/or by reference numeral. As will be described further below, steps may be performed by a machine, for example, a computing device and/or a processing unit. In some embodiments, the actions by the machines may be controlled by software including for example, a network device manager or the like. While the steps may be described in one order, it will be understood that variations to the order may be practiced or the order in which claims below are written may vary from the following without departing from the scope of the invention.

Figure 4:
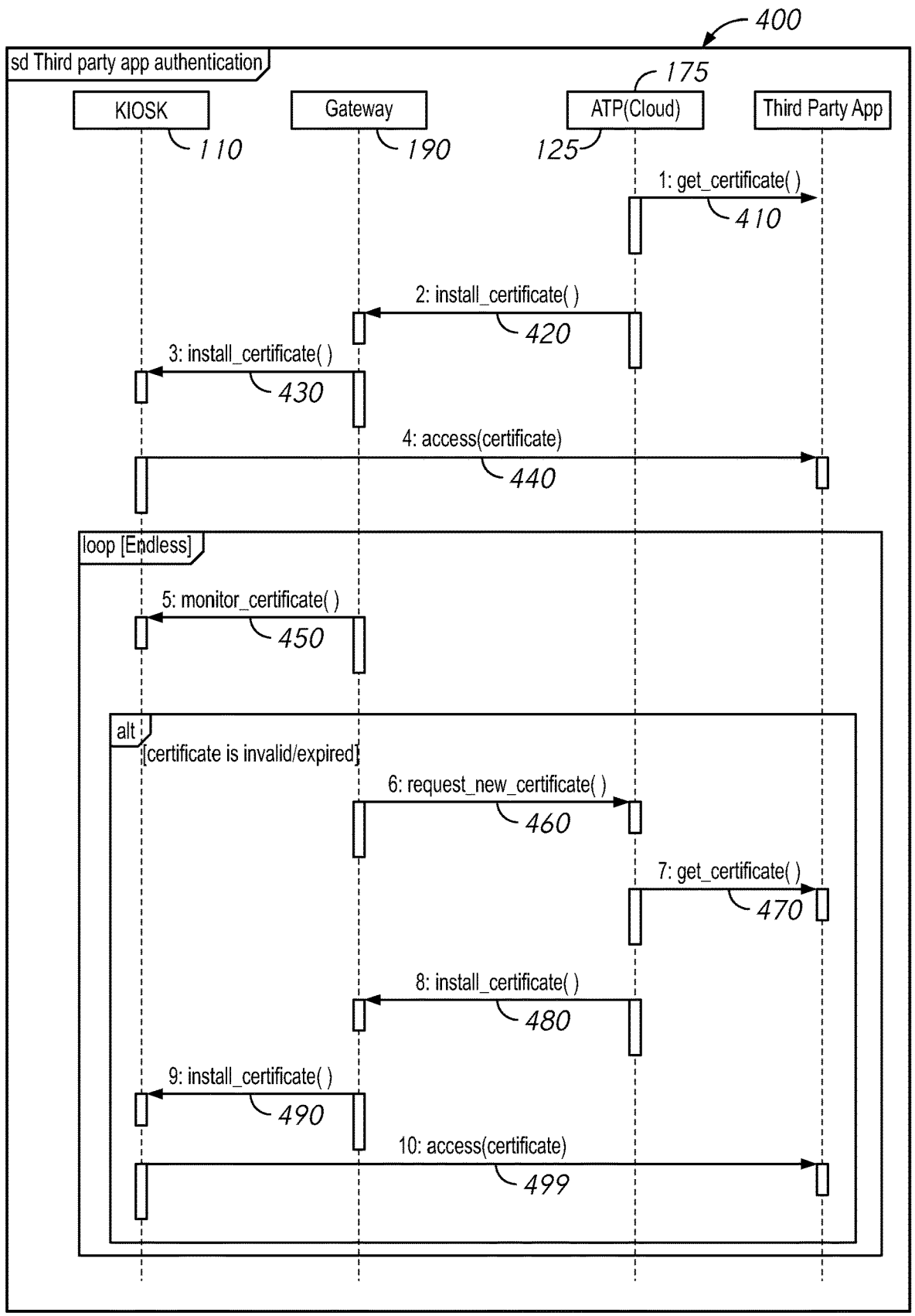
FIG. 4 is a flowchart of a method of managing certificates for third-party applications accessing kiosks in accordance with an embodiment of the subject technology.

Referring now to FIG. 4, a method 400 of managing third-party authentication in a kiosk is shown according to an exemplary embodiment. The network 125 may create a gateway 190 point that is available for connection with the kiosk 110. The kiosk 110 may receive a request for a print job through a third-party service. The request for the print job may be made by a user interfacing directly with the kiosk 110 or by the user sending a request for the print job to the third-party service which sends a message to the kiosk 110 seeking to send the print job document to the kiosk 110. The kiosk 110 may communicate a cloud-based print host server 125. The host server 125 may obtain 410 a security certificate. In some embodiments, the security certificate is from the third-party service. The host server 125 may install 420 a network gateway connected between the host server 125 and the kiosk 110. The installation of the gateway 190 may include forwarding the third-party service's security certificate information to the gateway 190. The host server 125, through the gateway 190, may install 430 the security certificate into memory of the kiosk 110. In response to the kiosk 110 requesting the print job document from the third-party service, the security keys installed at the kiosk 110 may be compared 440 to the security certificate information of the third-party site. For example, when the document is retrieved from the third-party service, the third-party service accompanies the document with security keys associated with the security certificate. If the keys match the security certificate information, the document may be accessed by the kiosk 110 and printed.

As may be appreciated, aspects of the subject technology also provide automated management of security certificate status at kiosks 110, which frees technicians from having to physically visit each kiosk to check for certificates, update certificates, or replace certificates as needed. Periodically, the kiosk 110 may request a new certificate from third-party services. This may be triggered when the installed security certificate becomes invalid or has expired. The request may be made 460 by connecting through the gateway 190 which is connected to the host server network 125. The service 175 may obtain 470 a new security certificate from the third-party service. Once received, the new security certificate may be routed 480 through the gateway 190 for installation 490 into the kiosk 110. The kiosk 110 may then access 499 the third-party service with document requests that are accompanied by security certificate keys authenticating that the request is secure between the kiosk 110 and the third-party service.

Those of skill in the art would appreciate that various components and blocks may be arranged differently (e.g., arranged in a different order, or partitioned in a different way) all without departing from the scope of the subject technology. The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

Thus, the claims are not intended to be limited to the aspects shown herein, but are to be accorded the full scope consistent with the language of claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method of managing third-party authentication in a kiosk, comprising:
   receiving at the kiosk, a request for a print job through a third-party service, wherein the third-party service is non-native to the kiosk;

accessing, by a processing unit in the kiosk, a cloud-based print host server;

obtaining by the host server, a security certificate;

installing by the host server, a network gateway connected between the host server and the processing unit of the kiosk, in response to the request for the print job; and installing, by the host server and through the gateway, in response to the request for the print job, the security certificate into memory of the kiosk.

2. The method of claim 1, wherein the security certificate is obtained from the third-party service.

3. The method of claim 1, further comprising retrieving a document for the print job after installation of the security certificate into the memory of the kiosk.

4. The method of claim 3, wherein the document is retrieved from the third-party service and the third-party service accompanies the document with security keys associated with the security certificate.

5. The method of claim 1, wherein the kiosk includes a connected printer.

6. The method of claim 1, further comprising:

retrieving, from the third-party service, a document for the print job after installation of the security certificate into the memory of the kiosk; and printing the document on a printer connected to the kiosk.

7. The method of claim 6, wherein the printer is integrated into the kiosk.

8. A computer program product for managing third party authentication in a kiosk, the computer program product comprising a non-transitory computer readable storage medium having computer readable program code embodied therewith, the computer readable program code being configured, when executed by a computer processor, to:

receive at the kiosk, a request for a print job through a third-party service, wherein the third-party service is non-native to the kiosk;

access, by a processing unit in the kiosk, a cloud-based print host server;

obtain by the host server, a security certificate;

install by the host server, a network gateway connected between the host server and the processing unit of the kiosk, in response to the request for the print job; and install, by the host server and through the gateway, in response to the request for the print job, the security certificate into memory of the kiosk.

9. The computer program product of claim 8, wherein the security certificate is obtained from the third-party service.

10. The computer program product of claim 9, further comprising computer readable code configured to:

retrieve a document for the print job after installation of the security certificate into the memory of the kiosk.

11. The computer program product of claim 10, wherein the document is retrieved from the third-party service and the third-party service accompanies the document with security keys associated with the security certificate.

12. The computer program product of claim 8, wherein the kiosk includes a connected printer.

13. The computer program product of claim 8, further comprising computer readable code configured to:

retrieving, from the third-party service, a document for the print job after installation of the security certificate into the memory of the kiosk; and printing the document on a printer connected to the kiosk.

14. The computer program product of claim 13, wherein the printer is integrated into the kiosk.

15. A host server for managing third party authentication in a kiosk, comprising:

a network connection;

a memory storage device; and a processor coupled to the network connection and connected to the memory storage device, wherein computer executable instructions in the memory storage device configure the processor to:

receive at the kiosk, a request for a print job through a third-party service, wherein the third-party service is non-native to the kiosk;

access, by a processing unit in the kiosk, a cloud-based print host server;

obtain by the host server, a security certificate;

install by the host server, a network gateway connected between the host server and the processing unit of the kiosk, in response to the request for the print job; and install, by the host server and through the gateway, in response to the request for the print job, the security certificate into memory of the kiosk.

16. The host server of claim 15, wherein the security certificate is obtained from the third-party service.

17. The host server of claim 15, wherein the processor of the computer is configured to retrieve a document for the print job after installation of the security certificate into the memory of the kiosk.

18. The host server of claim 17, wherein the document is retrieved from the third-party service and the third-party service accompanies the document with security keys associated with the security certificate.

19. The host server of claim 15, wherein the processor of the computer is further configured to:

retrieve, from the third-party service, a document for the print job after installation of the security certificate into the memory of the kiosk; and print the document on a printer connected to the kiosk.

20. The host server of claim 19, wherein the printer is integrated into the kiosk.

* * * * *